United States Patent
Friesen

(10) Patent No.: US 7,055,660 B2
(45) Date of Patent: Jun. 6, 2006

(54) ELECTROMECHANICAL BRAKE APPLYING DEVICE

(75) Inventor: Ulf Friesen, München (DE)

(73) Assignee: Knorr-Bremse Systeme für Schienenfahrzeuge GmbH, Munich (DE)

(*) Notice: Subject to any disclaimer, the term of this patent is extended or adjusted under 35 U.S.C. 154(b) by 0 days.

(21) Appl. No.: 10/451,015

(22) PCT Filed: Dec. 13, 2001

(86) PCT No.: PCT/EP01/14680

§ 371 (c)(1),
(2), (4) Date: Oct. 7, 2003

(87) PCT Pub. No.: WO02/49897

PCT Pub. Date: Jun. 27, 2002

(65) Prior Publication Data

US 2005/0006948 A1 Jan. 13, 2005

(30) Foreign Application Priority Data

Dec. 19, 2000 (DE) .............................. 100 63 228
Feb. 12, 2001 (DE) .............................. 101 06 377

(51) Int. Cl.
*F16D 69/00* (2006.01)
(52) U.S. Cl. ................................................ 188/265
(58) Field of Classification Search ............... 188/265, 188/33, 34, 162, 156, 157, 107, 72.7, 196 V, 188/35
See application file for complete search history.

(56) References Cited

U.S. PATENT DOCUMENTS

| | | | |
|---|---|---|---|
| 4,546,298 A | 10/1985 | Wickham et al. | |
| 6,267,207 B1 | 7/2001 | Fleischer et al. | |
| 6,276,497 B1 * | 8/2001 | Severinsson | 188/72.7 |

FOREIGN PATENT DOCUMENTS

| | | |
|---|---|---|
| DE | 196 17 796 A1 | 11/1997 |
| DE | 198 33 304 A1 | 7/1998 |
| DE | 199 06 228 A1 | 2/1999 |
| DE | 199 06 227 A1 | 8/2000 |
| EP | 1 029 762 A1 | 2/2000 |
| WO | WO 9847750 A1 * | 10/1998 |
| WO | WO 01/05638 A1 | 1/2001 |

\* cited by examiner

*Primary Examiner*—Melanie Torres
(74) *Attorney, Agent, or Firm*—Barnes & Thornburg LLP

(57) ABSTRACT

The invention relates to an electromechanical brake applying device, especially for a rail vehicle brake, comprising a) an operating brake unit for producing a load-corrected and/or a skid-controlled brake force, b) an accumulation brake unit having an energy accumulator for storing and supplying energy for applying the brake, and c) an unlockable locking device for the energy accumulator. According to the invention, at least one control and monitoring device is provided for monitoring the brake function of the brake applying device. When the brake applying device is intact, a signal for keeping the locking device locked can be produced by said control and monitoring device, and in the event of safety braking and/or park braking, the operating brake unit can be activated in order to apply the brake.

14 Claims, 2 Drawing Sheets

ELECTROMECHANICAL BRAKE APPLYING DEVICE

BACKGROUND AND SUMMARY OF THE INVENTION

The invention is based on an electromechanical brake application device, particularly for a rail vehicle brake.

Currently, three types of wheel braking systems are essentially used in the rail vehicle field: Pneumatic or electro-pneumatic braking systems, hydraulic or electro-hydraulic braking systems as well as mechanical or electromechanical braking systems. The wheel braking system may be constructed as an active or passive braking system, depending on whether the power of the brake actuator has to be applied for the engaging (active braking system) or for the releasing of the brake (passive braking system). In case of operating disturbances, energy is stored in air brake reservoirs if pneumatic systems are used; energy is stored in hydraulic reservoirs if hydraulic systems are used; and energy is accumulated in the form of accumulator-type springs when electromechanical systems are used.

From the prior art, electromechanical brake application devices are known which have a service-type brake unit as well as an accumulator-type brake unit which has an energy accumulator. The service-type brake unit contains a braking power generator for the application and/or release of the brake; for example, in the form of an electric-motor drive which can be controlled by a control device for slip-controlled or load-corrected braking. The accumulator-type brake unit comprises at least one energy accumulator for the storage and supply of energy for the application of the brake as a service-type emergency brake during a safety braking demand; as a parking brake; or a safety braking level, in the event of a failure of the service-type brake unit.

A power converter provides a conversion of the energy supplied by the braking power generator and/or by the energy accumulator to a brake application movement and comprises, for example, a brake spindle driven by the electric-motor drive.

For activating the energy accumulator, a locking device is provided which can be unlocked upon a safety braking and/or parking braking demand signal. The accumulator-type brake unit is generally constructed as a spring brake, the accumulator-type spring being held in the tensioned condition by the locking device. Upon the safety braking demand signal, which is controlled, for example, by a safety loop of the rail vehicle into the locking device, the locking device is released and the power of the accumulator-type spring can be transmitted by the power converter to brake shoes.

However, it is a disadvantage that, while the brake application device is intact, no non-skid-controlled or load-corrected feeding of the braking power can be achieved in order to permit a certain braking comfort during safety and parking braking.

In view of the above, the present invention is based on further developing an electromechanical brake application device such that, also during a safety braking and/or parking braking, a braking can take place in a non-skid-controlled and/or load-corrected manner.

When the safety braking or parking braking is demanded, while the brake application device is intact, a braking can take place in complete comfort, that is, in a load-corrected and or slip—or non-skid-controlled manner, by the service-type brake unit. The controlling-in of the braking power is monitored by the control and monitoring device. When the controlling-in of the braking power is correct (brake application device is intact), this control and monitoring device prevents the opening of the locking device and thus, in the event of a safety braking, the brake slip of the wheels of the rail vehicles which is frequently observed when the accumulator-type brake unit is triggered. As a result of this measure, the driving comfort can be improved, and the mechanical loads and the wear of the brake system can be reduced.

As a result of additional measures, advantageous further developments and improvements of the electro-mechanical brake application device can be achieved.

According to a particularly preferable measure, in the case of an intact brake application device, a feeding of the safety braking and/or parking braking signal to the locking device can be prevented by a switching device. The switching device can be controlled by the control and monitoring device, and instead a signal for maintaining the locked condition can be controlled in.

The locking device preferably has an electromagnetically operable construction, can be locked when energized and can be unlocked when not energized. The safety braking demand signal is formed by a currentless condition which can be controlled in by a safety loop of the rail vehicle.

The switching device contains at least one relay which, upon the safety braking demand signal and when the brake application device is intact, connects the locking device with a voltage source. An unlocking of the accumulator-type brake unit will then be reliably prevented by means of simple devices.

As an alternative, the locking device may have several locking elements, of which at least one locking element is sufficient for keeping the locking device locked. Thus, when the brake application device is intact, the control and monitoring device can output to this at least one locking element the signal for keeping the locking device locked.

The locking device may be electromagnetically operable and contains several solenoid coils as the locking elements for generating magnetic forces which lock or unlock the locking device. The magnetic force of at least one solenoid coil controllable by the control and monitoring device is sufficient for keeping the locking device locked. When the locking device is constructed with a double or multiple coil, a separate control of the individual coils can be implemented in mutually separated electric circuits, for example, by the control and monitoring device, on the one hand, and by a safety loop of the rail vehicle, on the other hand. Solenoid coils are identical parts; one or two additional solenoid coil(s) take up only a little more space. For this reason, the described solution requires little space and can be implemented in a cost-effective manner. Furthermore, solenoid coils are unsusceptible with respect to shock loads or vibration loads and have a long service life.

These and other aspects of the present invention will become apparent from the following detailed description of the invention, when considered in conjunction with accompanying drawings.

DETAILED DESCRIPTION OF THE PREFERRED EMBODIMENTS

Figure 1:
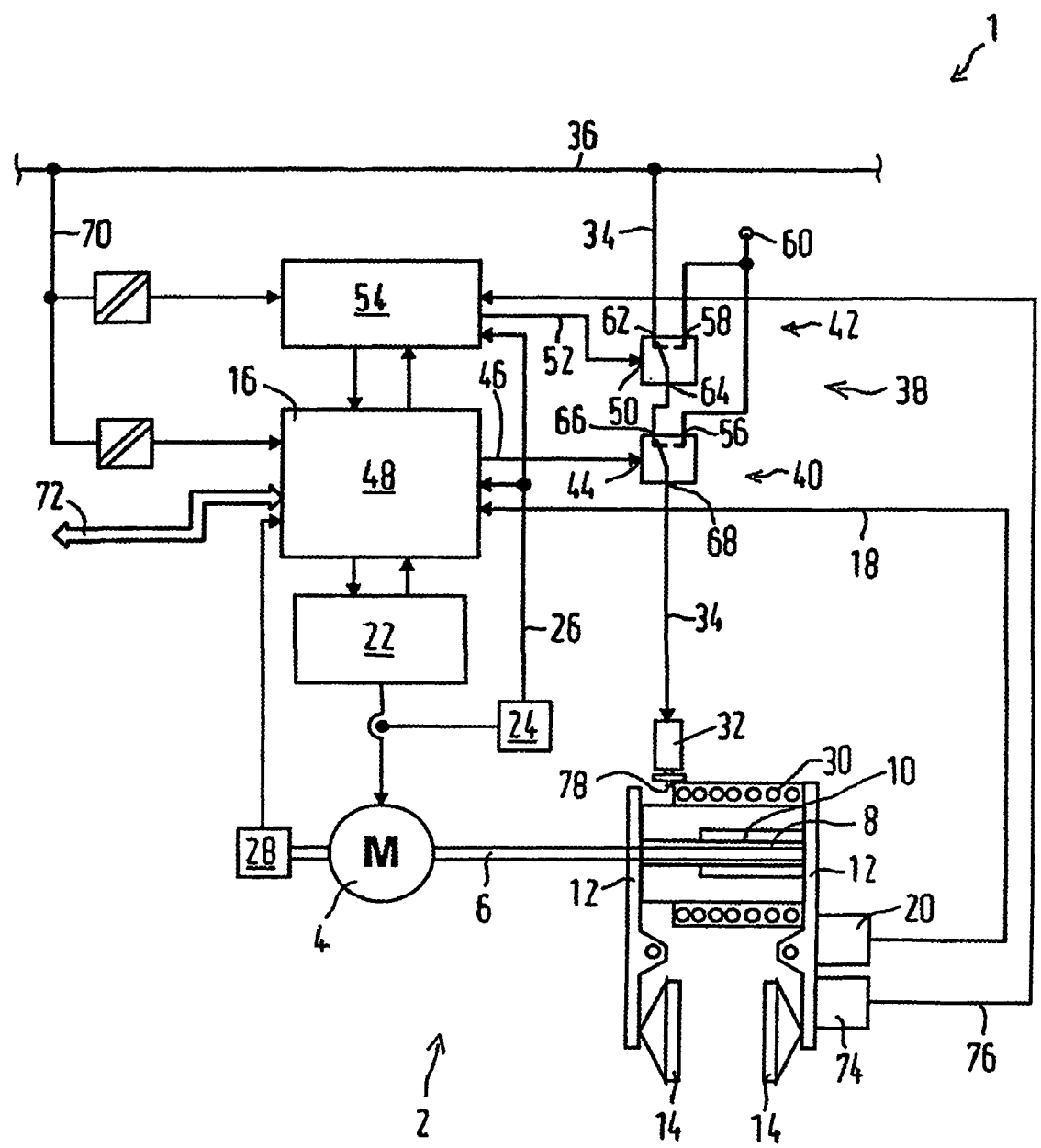
FIG. 1 is a very schematic representation of a preferred embodiment of a brake application device according to the invention.

A preferred embodiment of an electromechanical brake application device of a rail vehicle marked by reference number 1 in FIG. 1 contains a service-type brake unit with a brake actuator 2 which comprises a brake spindle 6 which can be driven by and electric servo motor 4. The brake spindle 6 is surrounded by a nut/spindle constructional unit 8 which preferably can be constructed as a roller thread drive, such as a circulating ball spindle, a roller thread drive, a thread roller screw drive or as a planetary roller thread drive. Therefore, during rotations of the brake spindle 6, a nut 10 of the nut/spindle constructional unit 8 is translatorily guided along the brake spindle 6 and, in the process, acts upon swivellably linked caliper levers 12. The swivelling movements of the caliper levers 12 are converted to essentially translatory brake application movements of brake linings in the direction of a brake disk axis which is not shown.

The service-type brake unit is constructed for generating load-corrected and/or slip-controlled braking powers. A load-corrected braking power is a braking power which is essentially adapted to the respectively present weight of the rail vehicle, and a slip-controlled braking power is a braking power by which the braking takes place with no wheel slip or only a little wheel slip. For this purpose, a control device 16 is provided by a signal line 18, a signal for the actual braking power value from a first power sensor 20 and can be compared there with a desired braking power value for determining a control difference. The desired braking power value definition is preferably oriented according to the reaching of a demanded braking power in a time period that is as short as possible.

The control device 16 controls the operating current for the servo motor 4 by a power part 22, as a function of the computer control difference between the actual current and a control current measured by a current sensor 24 and transmitted by a signal line 26 to the control device 16. The build-up of the braking power starts only after any lining play has taken place. A rotational speed sensor 28 is used as a position sensor or as a angle-of-rotation generator for a correct control of the motor by the control device 16.

Furthermore, the brake application device 1 contains an accumulator-type brake unit with an energy accumulator for storing and supplying energy for the application of the brake in the event of a safety braking or an emergency braking. The energy accumulator is preferably an accumulator-type spring 30 which is constructed as a coil spring, is coaxial with respect to the brake spindle and is tensioned in the brake release position. The spring 30 is supported by its end facing the servo motor 4 on a housing of the brake actuator 2 and, by means of its other end, on a sliding sleeve, which is not shown for reasons of scale. The spring 30 can be displaced coaxially with respect to the brake spindle 6, acts upon the caliper levers 12 and can be held in the release position by a locking device 32.

The locking device 32 is connected by electric line 34 with a safety loop 36 of the rail vehicle, on which a safety braking demand signal is present as a result of the operating of an emergency button or an emergency brake lever. A switching device 38 is arranged between the safety loop 36 and the locking device 32. The switching device 38 preferably comprises two series-connected relays—a first relay 40 and a second relay 42. As an alternative, any other type of switching element can be used, such as semiconductors, particularly transistors.

A control input 44 of the first relay 40 is connected by an electric control line 46 with the control and monitoring device 48 integrated in the control device 16. The control input 50 of the second relay 42 is connected by another control line 52 to another redundant control and monitoring device 54 which can communicate with the one control and monitoring device 48. Both relays 40, 42 are connected with their respective power inputs 56, 58 with a voltage source 60. Another power input 62 of the second relay 42 is connected with the safety loop 36, and its output 64 is connected with the additional power input 66 of the first relay 40. An output 68 of the first relay 40 is connected by the electric line 34 with the locking device 32. When they are not energized, both relays 40, 42 connect the electric line 34 between the locking device 32 and the safety loop 36, as illustrated in FIG. 1. The two control and monitoring devices 48, 54 can receive signals of the safety loop 36 by electric lines 70. Braking demand signals of a brake signal generator arrive by interface 72 at the control device 16. In addition, a system diagnosis can take place by way of the interface; furthermore, the interface represents a connection to a higher-ranking control.

A second power sensor 74 is connected by a signal line 76 with the redundant control and monitoring device 54. The output signals of the two power sensors 20, 74, as input signals for the control and monitoring devices 48, 54 and the control device 16, in addition to forming actual braking power values required for the computing of the control difference, also form criteria for the operability of the brake application device 1. The function test of the brake application device 1 preferably takes place online and continuously by the two control and monitoring devices 48, 54. Instead of directly measuring the braking power, sensors may also be provided for measuring physical quantities, from which the braking power can be derived.

The locking device 32 preferably has an electromagnetically operable construction and comprises a locking piston 78 which, when the locking device 32 is energized, locks the accumulator-type spring 30 in its tensioned position and, when the locking device 32 is not energized, unlocks the accumulator-type spring 30, so that the relaxing accumulator-type spring 30 can cause a brake application movement of the brake linings 14.

The servo motor 4 forms a braking power generator; the other elements of the power transmission path from the servo motor 4 to the brake linings 14 form a braking power converter. With this background, the brake application device 1 has the following function:

In the release position of the brake actuator 2, the accumulator-type spring 30 is tensioned. The two relays 40, 42 are in the switching position illustrated in FIG. 1, in which the locking device 32 is electrically connected with the safety loop 36. Since the safety loop 36 is energized in the normal operation, the locking device 32 is in the locked position. The force of the tensioned accumulator-type spring 30 can then be suppressed by the locking device 32.

During the transition from the release position to the service-type braking position, the control device 16 receives a braking demand signal by way of its interface 72, whereupon the servo motor 4 is driven by the power part 22 and the brake spindle 6 is caused to rotate. The nut 10 of the nut/spindle constructional unit 8 is screwed along the brake spindle 6 and the caliper levers 12 are spread. The accumulator-type spring 30 does not participate in the generating of the service-type braking power and remains in the tensioned condition because it is locked by the still energized locking device 32.

When an emergency button or an emergency brake lever of the rail vehicle is operated, a safety braking demand signal is generated in the safety loop 36, which safety braking demand signal is preferably generated by switching the safety loop 36 currentless or by removal of current. If it was determined by one or both control and monitoring devices 48, 54 that the brake application device 1 is without any defect, for example, by the braking power time courses of preceding brakings, the two relays 40, 42 are switched over such that the locking device 32 is energized by the voltage source 60. As a result, the locking device 32 remains locked despite the presence of the safety braking demand signal on the safety loop 36, and the accumulator-type spring 30 cannot relax. The safety braking demand signal generated by switching the safety loop 36 currentless, is therefore overwritten by the current supply of the locking device 32 generated by the control and monitoring devices 48, 54. Simultaneously, a service braking is triggered by the two control and monitoring devices 48, 54 switched currentless by way of the safety loop 36 on the control input side, during which service braking, by means of the servo motor 4, a slip-controlled and/or load corrected braking power is generated on the brake linings 14. If one of the two control and monitoring devices 48, 54 fails, its function can in each case be taken over by the other. In particular, the two relays 40, 42 are also switched such that, if one relay 40, 42 fails, the respective other relay 40, 42 can still provide an electric connection between the locking device 32 and the voltage source 60.

However, if one or both control and monitoring devices 48, 54 detect a defect in the brake application device 1, the two relays 40, 42 receive no switch-over signals from the control and monitoring devices 48, 54 and remain in their conduction position illustrated in FIG. 1. Because of the safety loop 36 switched currentless by the operation of the emergency button, the locking device 32 also receives no more current so that it unlocks the accumulator-type spring 30. The braking by the accumulator-type brake unit will then take place without slip control and without load correction.

Figure 2:
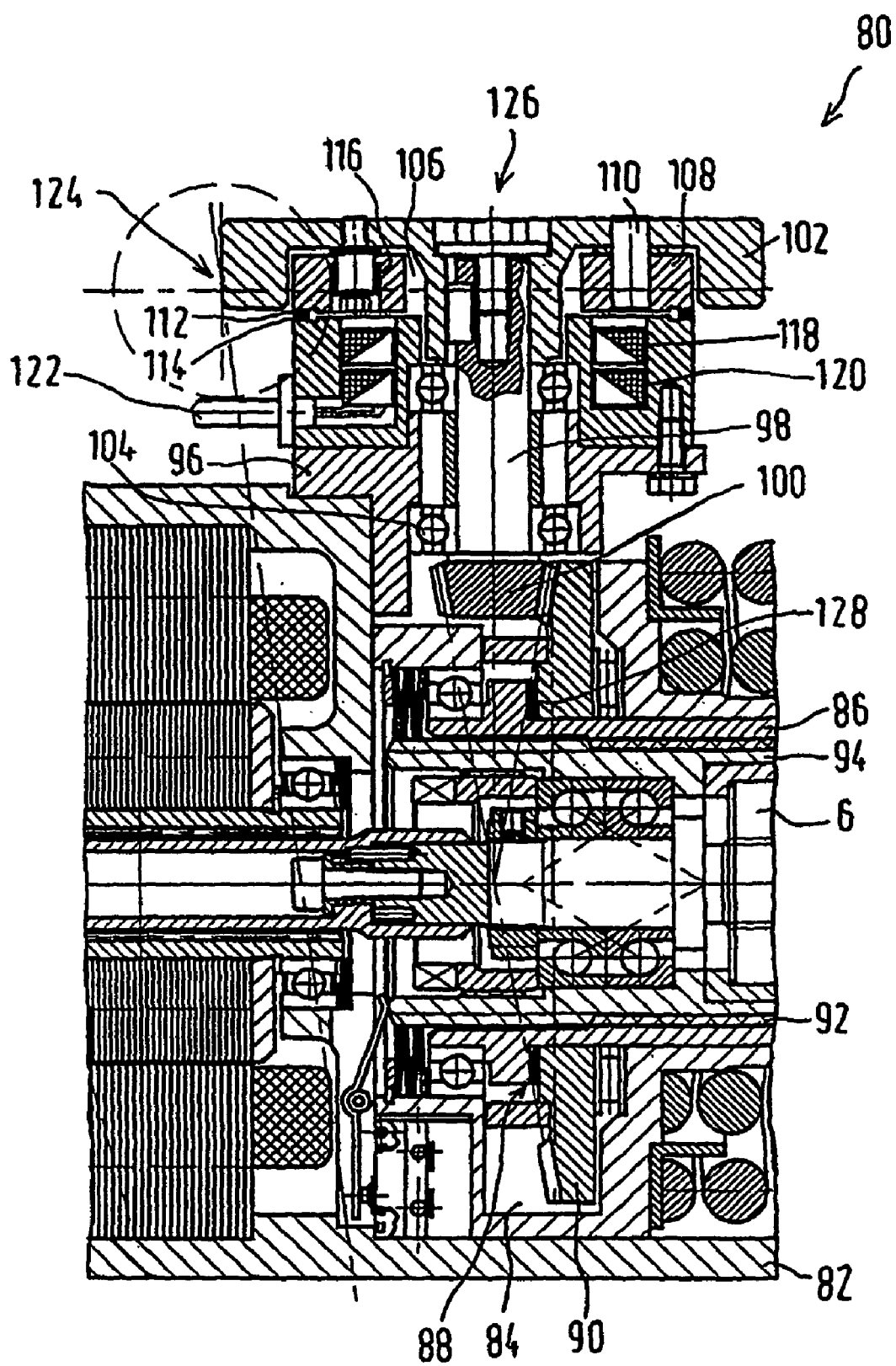
FIG. 2 is a sectional view of a locking device according to another embodiment of the brake application device.

FIG. 2 shows a locking device 80 according to another embodiment of the brake application device 1 according to the invention. The remaining components of the brake application device 1 are identical or analogous with the components described above. The following explanations relate to the construction of the locking device 80.

In an actuator housing 82 of the brake actuator 2, an annulus 84 is constructed in which a ring gear 90 is arranged which is in a driving connection with a locking nut 86 by a slipping clutch 88. The locking nut 86 can be rotated by a non-self-locking thread 92 with respect to a sliding sleeve 94. The locking thread 92 is displaceable in the direction of the brake spindle and on which the accumulator-type spring 30 is supported. The translatory moving-out movement of the locking thread 92 causes a swivelling of the caliper lever 12 in the brake application direction. The locking device 80 has a housing 96 which is flanged to a radial opening of the annulus 84. In addition, the locking device 80 comprises a shaft 98, on whose radial interior end, a bevel gear 100 is arranged and, on whose opposite radially exterior end, a cylindrical inertia disk 102 is arranged. The bevel gear 100 meshes with the toothing of the ring gear 90 and, together with it, forms a bevel gear pair which preferably has a relatively high transmission ratio. The shaft 98 is rotatably disposed in the housing 96 of the locking device 80 by deep groove ball bearings 104. The shaft 98 arranged perpendicular with respect to the brake spindle 6.

On its face pointing to the brake spindle 6, the inertia disk 102 has a ring recess 106 for a ring 108 which is arranged coaxial to the shaft 98 and is displaceably received along pins 110 extending in the axial direction, whereby it is non-rotatably connected with the inertia disk 102. In addition, the ring 108 has a radially external gear rim 112 on its face pointing away from the inertia disk 102. The gear rim 112 is situated opposite another gear rim 114 supported on the housing 96 of the locking device 80 and is pushed away from that gear rim 114 as a result of the effect of pressure springs 116. Furthermore, several, preferably two solenoid coils 118, 120 are arranged behind one another in the axial direction in the housing 96 of the locking device 80 and are situated opposite the ring 108. The solenoid coils 118, 120 can be individually energized by electric connections 122, for example. Together, the ring 108, the two gear rims 112, 114 and the two solenoid coils 118, 120 form a solenoid cogwheel brake 124.

In the case of at least one energized solenoid coil 118, 120, magnetic attraction powers or fields are generated which move the ring 108 against the effect of the pressure springs 116 along the pins 110 in the axial direction toward the solenoid coils 118, 120, the gear rim 112 of the ring 108 comes to engage with the gear rim 114 held on the housing 96 of the locking device 80 and thus enters into a non-rotatable connection therewith. Then, a torque acting from the accumulator-type spring 30 upon the sliding sleeve 94 and introduced by the locking nut 86 and the ring gear 90 into the locking device 80 can be supported on the housing 96 of the locking device 80. The flux of force extends through the bevel gear 100, the shaft 98 and the inertia disk 102. The solenoid coils 118, 120 act magnetically in the same direction and are designed such that the magnetic force of a single solenoid coil 118, 120 is sufficient for keeping the solenoid cogwheel brake 124 closed.

The solenoid coil 120, which is situated farther away from the ring 108, is in an electrically conductive connection by the connections 122 with the control and monitoring devices 48, 54 illustrated in FIG. 1 and receives current from this connection. The solenoid coil 118 situated closer to the ring 108 is connected to the safety loop 36. As an alternative, a reverse assignment is conceivable. Thus, if the safety loop 36 is switched currentless or no current, the solenoid coil 118 receives no current during a safety braking and therefore also generates no magnetic forces for locking the solenoid cogwheel brake 124. However, in the case of an intact brake application device, the safety brake demand signal generated during the switching to the currentless condition is overwritten in that the other solenoid coil 120 continues to be energized by the control and monitoring devices 48, 54. The resulting magnetic forces are sufficient for keeping the solenoid cogwheel brake 124 and thus the locking device 80 locked, so that the accumulator-type spring 30 cannot relax. In this case, as in the case of a service-type braking, the safety braking power will then be generated by the servo motor 4 controlled by the control device 16.

In addition or as an alternative, while the brake application device 1 is intact, at least one of the solenoid coils of the solenoid cogwheel brake 124 is energized by the control and monitoring devices 48, 54 or, as a result of the latter, remains in the energized condition if another solenoid coil is switched currentless because of the presence of a parking brake demand signal. Also in this case, the parking brake power, as in the case of a service braking, is generated by the servo motor 4 controlled by the control device 16.

In order to achieved a reduction of the power loss, the solenoid coil 120 controlled by the control and monitoring devices 48, 54 is operated by a holding current which is just high enough for holding the solenoid cogwheel brake 124 closed. As a result, the current consumption as well as the internal heating of the brake application device 1 is reduced.

If, however, the brake application device 1 should have a defect, the solenoid coil 120 is also switched currentless so that the gear rim 112 of the ring 108, as a result of the pressure springs 116, disengages from the gear rim 114 held at the housing 96 of the locking device 80 and, for this reason, the ring gear 90, together with the bevel gear 100, the shaft 98 and the inertia disk 102 can rotate freely with respect to the housing 96 of the locking device 80. As a result, the locking nut 86 can rotate along the non-self-locking thread 92 on the sliding sleeve 94 which is forced into the brake application position by the accumulator-type spring 30. As in the case of the above-described embodiment, the safety braking triggered by the accumulator-type spring 30 takes place without any slip control and without any load correction.

The inertia disk 102, the ring 108, the shaft 98 and the bevel gear 100, together, form an inertia weight 126 which can be rotated perpendicular to the brake spindle 6 and, relative to the slipping clutch 88, is arranged on the other side of the locking nut 86. Because of its radius, the inertia disk 102 is the largest portion of the mass moment of inertia of the inertia weight 126. During the brake application movement, the rotation of the locking nut 86 is translated by the bevel gear pair 90, 100 into a rotation of the inertia weight 126 which takes place at a higher rotational speed. Thus a large portion of the potential energy of the relaxing accumulator-type spring 30 is converted to rotational energy.

When the braking position has been reached, the rotation of the locking nut 86 will stop. The slipping clutch 88 between the locking nut 86 and the ring gear 90 is designed such that the upper limit torque, starting at which a relative rotation can take place between the radial serrations 128 of the ring gear 90 and of the locking nut 86, is exceeded by the torque from the product of the mass moment of inertia of the inertia weight 126 and of the deceleration in the braking end position existing after passing through the brake application stroke. Thus, after the braking end position has been reached, the inertia weight 126 can first continue to rotate and, essentially as a result of the friction taking place between the radial serrations 128 of the ring gear 90 and of the locking nut 86, is slowly caused to come to a stop. As a result, a gradual reduction of the rotational energy accumulated in the inertia weight 126 can take place.

For engaging the parking brake by the accumulator-type brake unit, all solenoid coils 118, 120 can be switched currentless by suitable measures in order to release the locking device 80. As an alternative and as a result of the reversal of the current flow in one or in both solenoid coils 118, 120, the direction of the magnetic forces can be reversed and thus the solenoid cogwheel brake 124 can be opened. Furthermore, another solenoid coil can be used which can be energized directly by a control line assigned to the parking brake and generates magnetic forces which counteract the magnetic forces of the two solenoid coils 118, 120.

Although the present invention has been described and illustrated in detail, it is to be clearly understood that this is done by way of illustration and example only and is not to be taken by way of limitation. The scope of the present invention is to be limited only by the terms of the appended claims.

The invention claimed is:

1. An electromechanical brake application device for a rail vehicle brake, the device comprising:
    a) a service-type brake unit for generating a load-corrected and/or slip-controlled braking power;
    b) an accumulator-type brake unit having an energy accumulator for storing and supplying energy for the application of the brake;
    c) an unlockable locking device for the energy accumulator; and
    d) at least one control and monitoring device for monitoring the braking function of the brake application device;
    the control and monitoring device, when the brake application device is intact, generates a signal for keeping the locking device locked and, also in the event of a safety and/or parking braking, the service-type braking unit is activated for applying the brake.

2. The electromechanical brake application device according to claim 1, wherein, when the brake application device is intact, the control and monitoring device constantly generates signals for keeping the locking device locked and overrides a safety and/or parking braking demand signal it generated for the unlocking of the locking device.

3. The electromechanical brake application device according to claim 1, wherein, when the brake application device is intact, the control and monitoring device prevents supplying of a safety and/or parking braking demand signal to the locking device by means of a switching device, and instead controls the signal for keeping the locking device locked.

4. The electromechanical brake application device according to claim 3, wherein the locking device has an electromagnetically operable construction, can be locked in an energized condition and can be unlocked when it is not energized, the safety braking demand signal being formed by a currentless condition which can be controlled by a safety loop of the rail vehicle.

5. The electromechanical brake application device according to claim 4, wherein the switching device contains at least one relay which, upon the safety braking demand signal and when the brake application device is intact, connects the locking device with a voltage source.

6. The electromechanical brake application device according to claim 1, wherein the locking device contains several locking elements, of which at least one locking element is sufficient for keeping the locking device locked, the signal for keeping the locking device locked being controllable from the control and monitoring device to this at least one locking element when the brake application device is intact.

7. The electromechanical brake application device according to claim 6, wherein the locking device is electromagnetically operable and, as the locking elements, contains several solenoid coils for generating magnetic forces locking or unlocking the locking device, the magnetic force of at least one solenoid coil controllable by the control and monitoring device being sufficient for keeping the locking device locked.

8. The electromechanical brake application device according to claim 1, wherein the control and monitoring device is integrated in a control device for the slip control and/or the load correction of the braking power generated by the service-type brake unit.

9. The electromechanical brake application device according to claim 8, wherein the braking power is constantly monitored with respect to the amount and the duration of action by the control and monitoring device.

10. The electromechanical brake application device according to claim 9, wherein the control and monitoring device is connected with a sensor for measuring physical quantities, from which the braking power generated by the service-type brake unit can be derived.

11. The electromechanical brake application device according to claim 10, wherein the output signal of the at least one sensor with the input signal for the control and monitoring device forms a criterion for the operability of the brake application device.

12. The electromechanical brake application device according to claim 11, including an additional redundant control and monitoring device controlling the locking device.

13. The electromechanical brake application device according to claim 1, wherein the locking device has an electromagnetically operable construction, can be locked in an energized condition and can be unlocked when it is not energized, the safety braking demand signal being formed by a currentless condition which can be controlled by a safety loop of the rail vehicle.

14. The electromechanical brake application device according to claim 3, wherein the switching device contains at least one relay which, upon the safety braking demand signal and when the brake application device is intact, connects the locking device with a voltage source.

* * * * *